US00RE48638E

(19) United States
(12) Reissued Patent
Fukui et al.

(10) Patent Number: US RE48,638 E
(45) Date of Reissued Patent: Jul. 13, 2021

(54) EVAPORATED FUEL PROCESSING APPARATUS

(71) Applicants: TOYOTA JIDOSHA KABUSHIKI KAISHA, Toyota (JP); AISAN KOGYO KABUSHIKI KAISHA, Obu (JP)

(72) Inventors: Keita Fukui, Fujinomiya (JP); Makoto Yamazaki, Gotemba (JP); Yoshikazu Miyabe, Obu (JP)

(73) Assignees: TOYOTA JIDOSHA KABUSHIKI KAISHA, Toyota (JP); AISAN KOGYO KABUSHIKI KAISHA, Obu (JP)

(21) Appl. No.: 16/700,705

(22) Filed: Dec. 2, 2019

Related U.S. Patent Documents

Reissue of:
(64) Patent No.: 10,400,688
Issued: Sep. 3, 2019
Appl. No.: 15/848,846
Filed: Dec. 20, 2017

(30) Foreign Application Priority Data

Dec. 21, 2016 (JP) ..... 2016-248072

(51) Int. Cl.
*F02M 25/08* (2006.01)
*F02D 41/00* (2006.01)

(52) U.S. Cl.
CPC ..... *F02M 25/0872* (2013.01); *F02D 41/003* (2013.01); *F02D 41/004* (2013.01); *F02D 2200/0602* (2013.01); *F02D 2250/16* (2013.01); *F02M 25/0854* (2013.01)

(58) Field of Classification Search
CPC ..... F02M 25/0872; F02M 25/0854; F02D 41/003; F02D 41/004; F02D 2250/16; F02D 2200/0602
See application file for complete search history.

(56) References Cited

U.S. PATENT DOCUMENTS 5,657,734 A * 8/1997 Sawamoto ..... B60K 15/03519 123/516
9,638,143 B2 5/2017 Ito ..... F02D 41/2441
2004/0250805 A1* 12/2004 Osanai ..... F02M 25/0827 123/698
2009/0250122 A1 10/2009 Menke ..... F02M 25/089 137/511
2014/0102420 A1* 4/2014 Kimoto ..... F02M 25/0836 123/520

(Continued)

FOREIGN PATENT DOCUMENTS

DE 10 2008 017 004 A1 10/2009
DE 10 2013 016 984 A1 4/2014

(Continued)

*Primary Examiner* — William C Doerrler
(74) *Attorney, Agent, or Firm* — Hunton Andrews Kurth LLP

(57) ABSTRACT

An evaporated fuel processing apparatus is provided with an initializer configured to increase a step number with which a stepping motor is rotated in a valve closing direction, when there is an initialization request for the blocking valve and tank pressure of the fuel tank is in a predetermined pressure range near atmospheric pressure, in comparison with when the tank pressure is out of the predetermined pressure range.

1 Claim, 4 Drawing Sheets

(56) References Cited

U.S. PATENT DOCUMENTS

| | | | | |
|---|---|---|---|---|
| 2015/0159568 | A1* | 6/2015 | Tagawa | F02D 41/003 137/624.27 |
| 2015/0159598 | A1* | 6/2015 | Tagawa | F02M 25/0854 123/520 |
| 2015/0330338 | A1 | 11/2015 | Ito | F02M 25/089 123/520 |
| 2016/0108865 | A1 | 4/2016 | Tagawa et al. | F02M 25/089 123/519 |
| 2016/0298577 | A1* | 10/2016 | Kimoto | F02M 25/0836 |
| 2016/0356227 | A1* | 12/2016 | Akita | B60K 15/03504 |
| 2017/0145932 | A1* | 5/2017 | Tagawa | F02M 25/089 |
| 2017/0284321 | A1* | 10/2017 | Kimoto | F02M 25/0836 |
| 2017/0292477 | A1 | 10/2017 | Kimoto et al. | B60K 15/03519 |
| 2017/0305266 | A1 | 10/2017 | Kimoto et al. | B60K 15/03519 |
| 2017/0356394 | A1* | 12/2017 | Murai | F02D 41/0045 |

FOREIGN PATENT DOCUMENTS

| | | | |
|---|---|---|---|
| DE | 10 2015 013 391 | A1 | 4/2016 |
| DE | 11 2015 004 004 | T5 | 5/2017 |
| DE | 11 2015 004 005 | T5 | 5/2017 |
| JP | 2015-218659 | A | 12/2015 |
| WO | 2016/035655 | A1 | 3/2016 |
| WO | 2016/035656 | A1 | 3/2016 |

* cited by examiner

EVAPORATED FUEL PROCESSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This is an application for reissue of U.S. Pat. No. 10,400,688.*

This application is based upon and claims the benefit of priority of the prior Japanese Patent Application No. 2016-248072, filed on Dec. 21, 2016, the entire contents of which are incorporated herein by reference.

BACKGROUND OF THE INVENTION

1. Field of the Invention

Embodiments of the present invention relate to an evaporated fuel processing apparatus configured to process evaporated fuel generated in a fuel tank.

2. Description of the Related Art

For this type of apparatus, for example, there is proposed an apparatus provided with: a canister containing adsorbent for adsorbing evaporated fuel generated in a fuel tank; and a blocking valve with a stepping motor disposed in a vapor passage, which connects the canister and the fuel tank (refer to Japanese Patent Application Laid Open No. 2015-218659). Japanese Patent Application Laid Open No. 2015-218659 discloses that when step-out of the stepping motor is detected, initialization for moving the blocking valve to a predetermined initial position is performed at an initialization time, which is determined in advance as the best time for not adversely affecting engine operation.

A rotation amount (or rotation angle) of the stepping motor is controlled in a step unit. In the initialization of the blocking valve, in most cases, the stepping motor is rotated with a predetermined step number (i.e. a predetermined number of steps) in a valve closing direction, from a position at which the step number of the stepping motor is "0" (i.e. the initial position).

Such control is effective to certainly initialize the blocking valve when the position at which the step number of the stepping motor is "0" is shifted from a true initial position. If, however, the predetermined step number is set as a fixed value, the aforementioned control possibly accelerates deterioration of the blocking valve when the position at which the stepping number of the stepping motor is "0" is not shifted from the true initial position.

SUMMARY

In view of the aforementioned problems, it is therefore an object of embodiments of the present invention to provide an evaporated fuel processing apparatus configured to allow both appropriate initialization of the blocking valve and suppression of the deterioration of the blocking valve.

The above object of embodiments of the present invention can be achieved by an evaporated fuel processing apparatus including: a canister containing adsorbent for adsorbing evaporated fuel generated in a fuel tank; a vapor passage connecting the canister and the fuel tank; and a blocking valve disposed in the vapor passage, wherein the blocking valve is [open] *closed* when a stroke amount is less than a predetermined amount, and the blocking valve is [closed] *open* when the stroke amount is greater than or equal to the predetermined amount, wherein the blocking valve has a stepping motor configured to adjust the stroke amount, and said evaporated fuel processing apparatus comprises an initializer configured to increase a step number with which the stepping motor is rotated in a valve closing direction, when there is an initialization request to move the blocking valve in the valve closing direction to a predetermined initial position and tank pressure of the fuel tank is in a predetermined pressure range close to atmospheric pressure, in comparison with when the tank pressure is out of the predetermined pressure range.

When the blocking valve is closed, the tank pressure of the fuel tank is, to some extent, higher or lower than the atmospheric pressure. By the way, pressure in the canister is maintained at the atmospheric pressure, except in special cases, such as e.g. fault diagnosis. Thus, when the blocking valve is not closed due to the step-out, the canister and the fuel tank are communicated by the vapor passage, and the tank pressure of the fuel tank is thus the atmospheric pressure. In other words, when the tank pressure of the fuel tank is close to the atmospheric pressure, the blocking valve is most likely not closed. On the other hand, when the tank pressure is, to some extent, higher or lower than the atmospheric pressure, the blocking valve is most likely closed.

The present inventors have paid attention to this point and have configured the evaporated fuel processing apparatus as described above. In other words, the evaporated fuel processing apparatus is configured to enable the initializer to increase the step number with which the stepping motor is rotated in the valve closing direction, in comparison with when the tank pressure is out of the predetermined pressure range (i.e. when the blocking valve is most likely closed), because the blocking valve is most likely not closed when the tank pressure of the fuel tank is in the predetermined pressure range.

As a result, the blocking valve can be appropriately initialized because the stepping motor is a relatively large number of steps in the valve closing direction in the initialization of the blocking valve when the tank pressure is in the predetermined pressure range. On the other hand, the deterioration of the blocking valve can be suppressed because the stepping motor is a relatively small number of steps in the valve closing direction in the initialization of the blocking valve when the tank pressure is out of the predetermined pressure range.

The "predetermined pressure range" may be set as a range that can be regarded as the atmospheric pressure, in view of e.g. measurement accuracy of a pressure sensor configured to measure the tank pressure, measurement errors caused by a mounting position of the pressure sensor in the fuel tank, or the like.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

An evaporated fuel processing apparatus according to an embodiment of the present invention will be explained with reference to FIG. 1 to FIG. 4.

(Entire Configuration)

Figure 1:
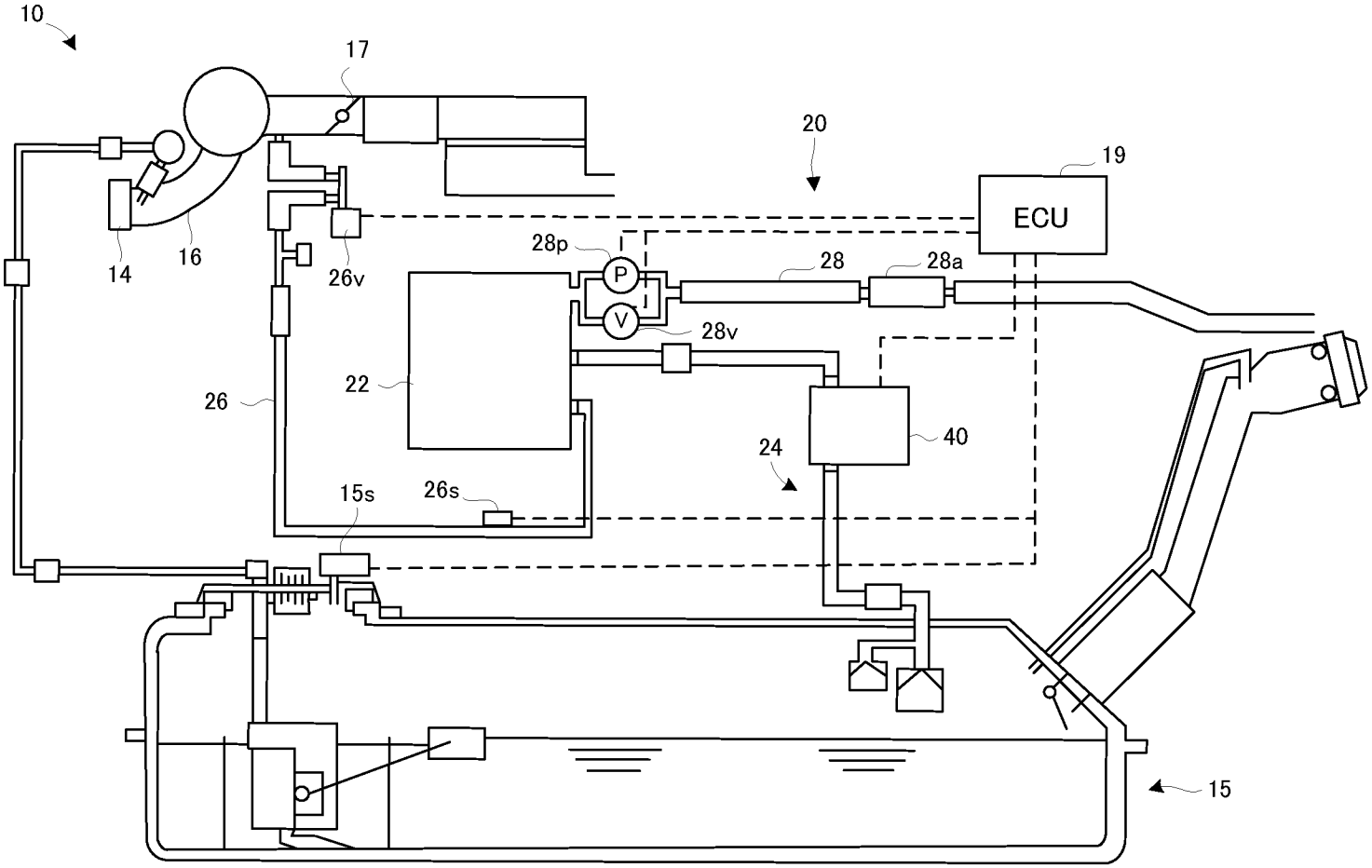
FIG. 1 is an entire configuration diagram illustrating an evaporated fuel processing apparatus according to an embodiment.

A configuration of the evaporated fuel processing apparatus according to the embodiment of the present invention will be explained with reference to FIG. 1. FIG. 1 is an entire configuration diagram illustrating the evaporated fuel processing apparatus according to the embodiment.

In FIG. 1, an evaporated fuel processing apparatus 20 is provided in an engine system 10 of a not-illustrated vehicle, and is configured to prevent that evaporated fuel generated in a fuel tank 15 of the vehicle leaks out.

The evaporated fuel processing apparatus 20 is provided with a canister 22, a vapor passage 24, a purge passage 26, and an atmospheric air passage 28. The canister 22 is filled with activated carbon as adsorbent. The canister 22 is configured to adsorb the evaporated fuel in the fuel tank 15 by using the adsorbent. The vapor passage 24 is communicated, at one end, with a gas layer part in the fuel tank 15, and is communicated, at the other end, with the canister 22. The vapor passage 24 is provided with a blocking valve 40 configured to switch between communication and shutoff in the vapor passage 24. The purge passage 26 is communicated, at one end, with the canister 22, and is communicated, at the other end, with a downstream side of a throttle valve 17 in an intake passage 16 of an engine 14. The purge passage 26 is provided with a purge valve 26v configured to switch between communication and shutoff in the purge passage 26.

The canister 22 is communicated with the atmospheric air passage 28 with a tip opened to the atmosphere. The atmospheric air passage 28 is provided with an air filter 28a. The atmospheric air passage 28 is also provided with a switching valve 28v configured to switch between communication and shutoff in the atmospheric air passage 28, wherein the switching valve 28v is disposed nearer to the canister 22 than the air filter 28a. The switching valve 28v includes, for example, a normally open solenoid valve, which is open when the solenoid is not energized. The atmospheric air passage 28 is also provided with a pump 28p configured to forcibly feed an atmospheric air to the canister 22, wherein the pump 28p is parallel to the blocking valve 28b. The pump 28p may be of any type as long as it can pressurize an inside of a system including the canister 22 and the fuel tank 15, but is preferably configured not to generate a gas flow in an OFF state.

The blocking valve 40, the purge valve 26v, the switching valve 28v, and the pump 28p are controlled on the basis of signals from an electronic control unit (ECU) 19. In other words, in the embodiment, a part of functions of the ECU 19 for various electronic controls of the vehicle is used as a part of the evaporated fuel processing apparatus 20.

The evaporated fuel processing apparatus 20 is provided with: a tank pressure sensor 15s disposed in the fuel tank 15; and an evaporation system pressure sensor (hereinafter referred to as a "system pressure sensor") 26s disposed nearer to the canister 22 than the purge valve 26 in the purge passage 26, as pressure sensors configured to detect pressure in the system. The tank pressure sensor 15s is configured to detect pressure of an area on the side of the fuel tank 15 out of two areas into which the system is separated by the blocking valve 40. The system pressure sensor 26s is configured to detect pressure of an area including the canister 22 (or specifically, an area into which the system is partitioned by the purge valve 26v, the switching valve 26v, and the blocking valve 40) (hereinafter referred to as "system pressure") out of two areas into which the system is separated by the blocking valve 40. The ECU 19 is configured to receive signals from the tank pressure sensor 15s and the system pressure sensor 26s.

(Overview of Operation of Evaporated Fuel Processing Apparatus)

Next, an overview of operation of the evaporated fuel processing apparatus 20 configured in the above manner will be explained. The ECU 19 is configured to appropriately open the purge valve 26v if a predetermined purge condition is satisfied during running of the vehicle. At this time, the switching valve 28v is open, and the atmospheric air thus flows in from the atmospheric air passage 28 due to intake negative pressure of the engine 14. The evaporated fuel purged from the adsorbent of the canister 22 by the atmospheric air is introduced into an intake passage 17 of the engine 14 via the purge valve 26v. The ECU 19 is also configured to open the blocking valve 40 and to perform depressurization control of the fuel tank 15 if the pressure of the fuel tank 15 detected by the tank pressure sensor 15s is higher than a predetermined pressure. Various existing aspects can be applied to the control associated with the purge of the evaporated fuel adsorbed on the adsorbent of the canister 22, and the depressurization control of the fuel tank 15. An explanation of the details of the controls will be thus omitted.

(Configuration of Blocking Valve)

Figure 2:
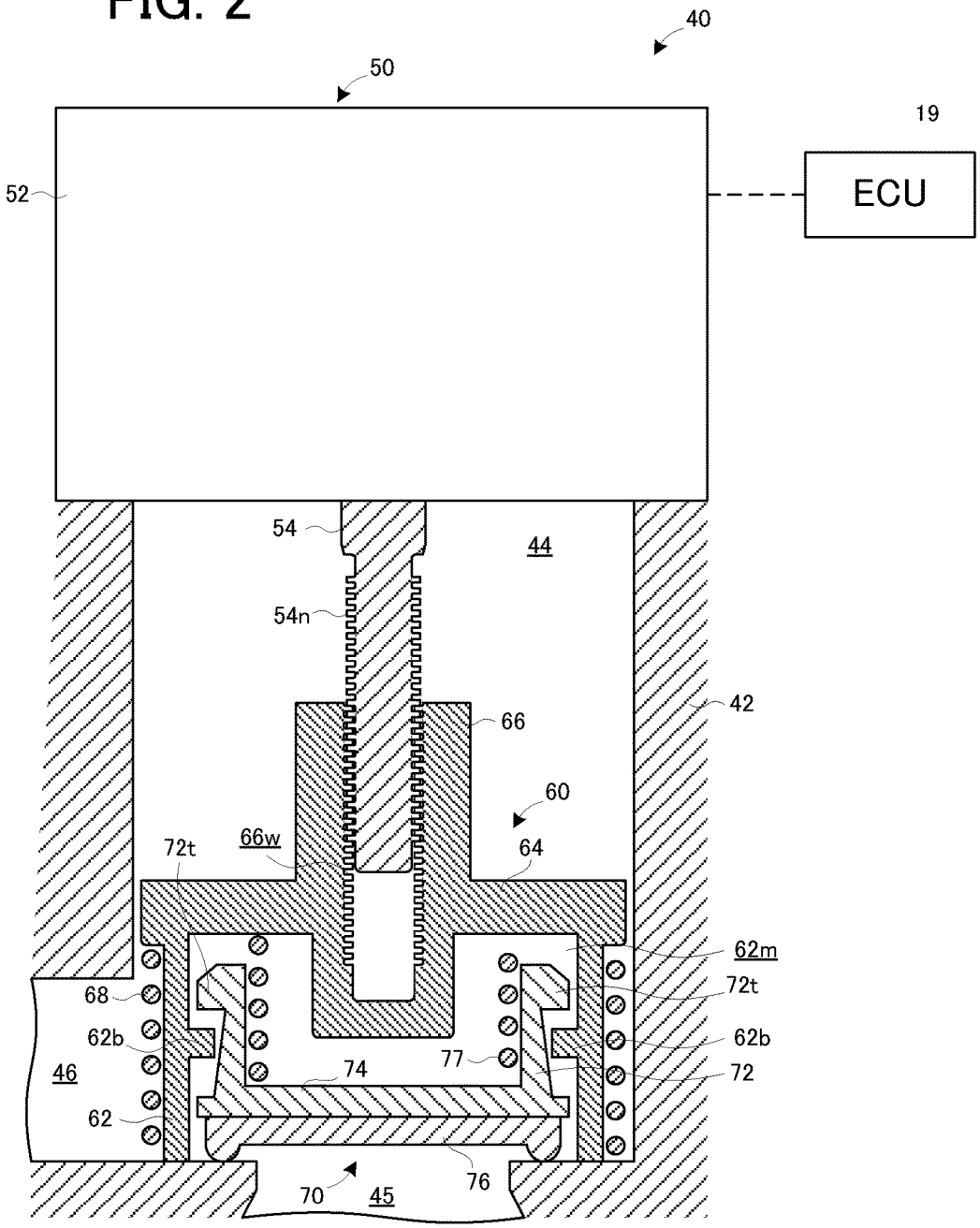
FIG. 2 is a longitudinal sectional view illustrating one state of a blocking valve according to the embodiment.

A configuration of the blocking valve 40 will be explained with reference to FIG. 2. FIG. 2 is a longitudinal sectional view illustrating one state of the blocking valve according to the embodiment.

The blocking valve 40 is a flow control valve configured to block the vapor passage 24 in a valve closed state, and to control a flow of a gas that flows in the vapor passage 24 in a valve open state. In FIG. 2, the blocking valve 40 is provided with a valve casing 42, a stepping motor 50, a valve guide 60, and a valve body 70. The valve casing 42 is provided with a valve chamber 44, an inlet passage 45, and an outlet passage 46. The valve chamber 44, the inlet passage 45, and the outlet passage 46 constitute a fluid passage.

The stepping motor 50 is mounted on an upper part of the valve casing 42. The stepping motor 50 has: a motor body 52; and an output shaft 54, which protrudes from a lower surface of the motor body 52 and which is configured to rotate in forward and reverse directions. The output shaft 54 is concentrically disposed in the valve chamber 44 of the valve casing 42, and a male screw 54n is formed on an outer peripheral surface of the output shaft 54.

The valve guide 60 is provided with a cylindrical wall 62 and an upper wall 64 configured to close an upper end opening of the cylindrical wall 62, and is formed in a topped cylindrical shape. A cylindrical shaft 66 is concentrically formed in a central part of the upper wall 64. A female screw 66w is formed on an inner peripheral surface of the cylindrical shaft 66. The valve guide 66 is movably disposed in an axial direction (or vertical direction), while rotation around the axial direction is stopped by a not-illustrated detent or rotation stopper, with respect to the valve casing 42.

The male screw 54n of the output shaft 54 of the stepping motor 50 is screwed into the female screw 66w of the cylindrical shaft 66 of the valve guide 60. This makes it possible for the valve guide 60 to move up and down in the axial direction on the basis of the forward and reverse rotation of the output shaft 54 of the stepping motor 50. Around the valve guide 60, there is provided an auxiliary spring 68 configured to bias the valve guide 60 upward.

The valve body 70 is provided with a cylindrical wall 72 and a lower wall 74 configured to close a lower end opening of the cylindrical wall 72, and is formed in a bottomed cylindrical shape. On a lower surface of the lower wall 74, for example, there is disposed a seal member 76 made of a disk-shaped rubber elastic material. The valve body 70 is concentrically disposed in the valve guide 60. The seal member 76 of the valve body 70 is disposed to abut on an upper surface of a valve seat of the valve casing 42 (near an end on the side of the valve chamber 44 in the inlet passage 45).

On an outer peripheral surface of the cylindrical wall 72 of the valve body 70, a plurality of coupling protrusions 72t are formed in a circumferential direction. The coupling protrusions 72t of the valve body 70 are fit in vertically-grooved coupling recesses 62m formed in an inner peripheral surface of the cylindrical wall 62 of the valve guide 60, to be relatively movable in the vertical direction by a fixed dimension. The valve guide 60 and the valve body 70 are configured to integrally move upward (i.e. in a valve opening direction) while bottom walls 62b of the coupling recesses 62m of the valve guide 60 abut on the coupling protrusions 72t of the valve body 70 from below. Between the upper wall 64 of the valve guide 60 and the lower wall 74 of the valve body 70, there is concentrically provided a valve spring 77 configured to bias the valve body 70 always downward (i.e. in a valve closing direction) with respect to the valve guide 60.

(Operation of Blocking Valve)

Next, operation of the blocking valve 40 as configured above will be explained. The blocking valve 40 is configured to rotate the stepping motor 50 with a predetermined step number (i.e. a predetermined number of steps) in the valve opening direction or the valve closing direction on the basis of the signals from the ECU 19. As a result, due to screwing action of the male screw 54n of the output shaft 54 of the stepping motor 50 and the female screw 66w of the cylindrical shaft 66 of the valve guide 60, the valve guide 60 may move by a predetermined stroke amount in the vertical direction.

In an initial state of the blocking valve 40, the valve guide 60 is held at a lower limit position, and a lower end face of the cylindrical wall 62 abuts on the upper surface of the valve seat of the valve casing 42. In this state, the coupling protrusions 72t of the valve body 60 are located above the bottom walls 62b of the coupling recesses 62m of the valve guide 60 (refer to FIG. 2), and the seal member 76 of the valve body 70 is pressed to the upper surface of the valve seat of the valve casing 42 by spring force of the valve spring 77. A position of the blocking valve 40 in the initial state (which is specifically a position of the valve guide 60) is one example of the "initial position" according to embodiments of the present invention.

When the stepping motor 50 is rotated in the valve opening direction from the initial state of the blocking valve 40, the valve guide 60 moves upward due to the screwing action of the male screw 54n and the female screw 66w, and the bottom walls 62b of the coupling recesses 62m of the valve guide 60 abut on the coupling protrusions 72t of the valve body 70 from below. Then, when the stepping motor 50 is further rotated in the valve opening direction and the valve guide 60 further moves upward, the valve body 70 moves upward with the valve guide 60, and the seal member 76 of the valve body 70 leaves the valve seat of the valve casing 42. As a result, the blocking valve 40 is opened.

(Initialization Operation of Blocking Valve)

Next, an initialization operation of the blocking valve 40 according to the embodiment will be explained with reference to FIG. 3 and FIG. 4.

Figure 3:
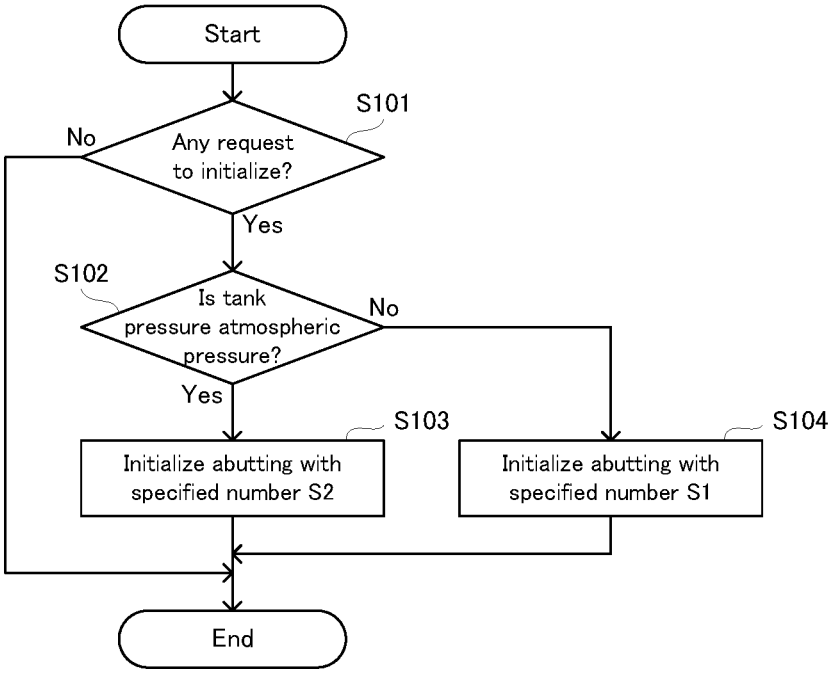
FIG. 3 is a flowchart illustrating an initialization process of the blocking valve according to the embodiment.

In FIG. 3, the ECU 19 as a part of the evaporated fuel processing apparatus 20 determines whether or not there is a request to initialize the blocking valve 40 (step 5101). Here, the initialization of the blocking valve 40 is requested, for example, in ignition off, in ignition on, at the start of on board diagnosis (OBD) associated with the evaporated fuel processing apparatus 20, and the like. The "ECU 19" according to the embodiment is one example of the "initializer" according to embodiments of the present invention.

In the determination in the step S101, if it is determined that there is no request to initialize the blocking valve 40 (the step 5101: No), the process is ended. Then, the ECU 19 performs the process in the step S101 again after a lapse of a predetermined time.

On the other hand, in the determination in the step S101, if it is determined that there is a request to initialize the blocking valve 40 (the step 5101: Yes), the ECU 19 determines whether or not tank pressure of the fuel tank 15 detected by the tank pressure sensor 15s is atmospheric pressure (step S102). Specifically, the ECU 19 determines whether or not the tank pressure is in a predetermined pressure range close to the atmospheric pressure (i.e. is greater than or equal to −predetermined value A and is less 30 than or equal to the predetermined value A).

Here, the "predetermined value A" is set as a value that is higher than the atmospheric pressure, by a value that is determined in view of, e.g. measurement accuracy of the tank pressure sensor 15s, measurement errors caused by a mounting position of the tank pressure sensor 15s in the fuel tank 15, or the like. The "−predetermined value A" is set as a value that is lower than the atmospheric pressure, by a value that is determined in view of, e.g. the measurement accuracy of the tank pressure sensor 15s, the measurement errors caused by the mounting position of the tank pressure sensor 15s in the fuel tank 15, or the like.

In the determination in the step S102, if it is determined that the tank pressure is not the atmospheric pressure, i.e. if it is determined that the tank pressure is out of the predetermined pressure range (the step S102: No), the ECU 19 sets a target step number of the stepping motor 50 to a specified number S1, and initializes the blocking valve 40 (step S104).

Here, the "specified number S1" is less than "0". In other words, in the initialization of the blocking valve 40, the ECU 19 may rotate the stepping motor 50 with a step number indicated by the specified number S1 (or a specified number S2 described later) in the valve closing direction, from a position at which the step number of the stepping motor 50 is "0". Rotating the stepping motor 50 in the valve closing direction from the position at which the step number of the stepping motor 50 is "0" is referred to as "abutting" in the embodiment.

Figure 4A:
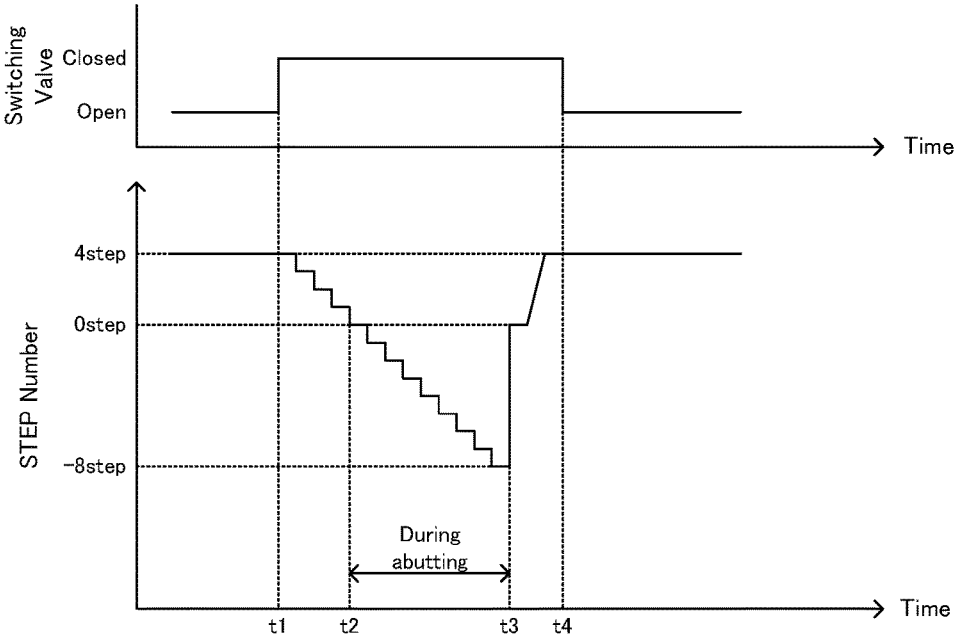
FIG. 4A and FIG. 4B are conceptual diagrams illustrating a concept of time variation of step number of a stepping motor in an initialization operation according to the embodiment.

The initialization of the blocking valve 40 when the target step number is set to the specified number S1 will be specifically explained with reference to FIG. 4A. FIG. 4A illustrates that the specified number S1 is, but not limited to, "−8".

It is assumed that the tank pressure is determined to be not the atmospheric pressure in the determination in the step S102 at a time point t1 in FIG. 4A. As a result, the ECU 19 may energize and open the switching valve 28v, may set the target step number to "−8 (i.e. the specified number S1)", and may start to initialize the blocking valve 40.

As illustrated in FIG. 4A, the ECU 19 may rotate the stepping motor 50 step by step in the valve closing direction. The step number is "0" at a time point t2. Even after that, the ECU 19 may rotate the stepping motor 50 in the valve closing direction. When the step number reaches "−8", the ECU 19 may stop the rotation of the stepping motor 50 (at a time point t3), and may modify only the step number to "0". In other words, the ECU 19 is configured to redefine the position of the blocking valve 40 corresponding to the step number of "−8" (specifically, the position of the valve guide 60) as the step number of "0", before a time point t3. The ECU 19 may then rotate the stepping motor 50 a predetermined number of steps (or four steps herein) in the valve opening direction, may open the switching valve 28v (at a time point t4), and may end the initialization of the blocking valve 40.

The valve guide 60 slightly floats from the valve seat of the valve casing 42 by rotating the stepping motor 50 in the valve closing direction the predetermined steps from the step number "0". It is thus possible to suppress that excessive force is applied between the valve guide 60 and the valve seat due to e.g. an environmental change such as temperature.

Back in FIG. 3 again, in the determination in the step S102, if it is determined that the tank pressure is the atmospheric pressure, i.e. if it is determined that the tank pressure is in the predetermined pressure range (the step S102: Yes), the ECU 19 sets the target step number of the stepping motor 50 to a specified number S2, which has a greater absolute value than that of the specified number S1, and initializes the blocking valve 40 (step 5103).

Figure 4B:
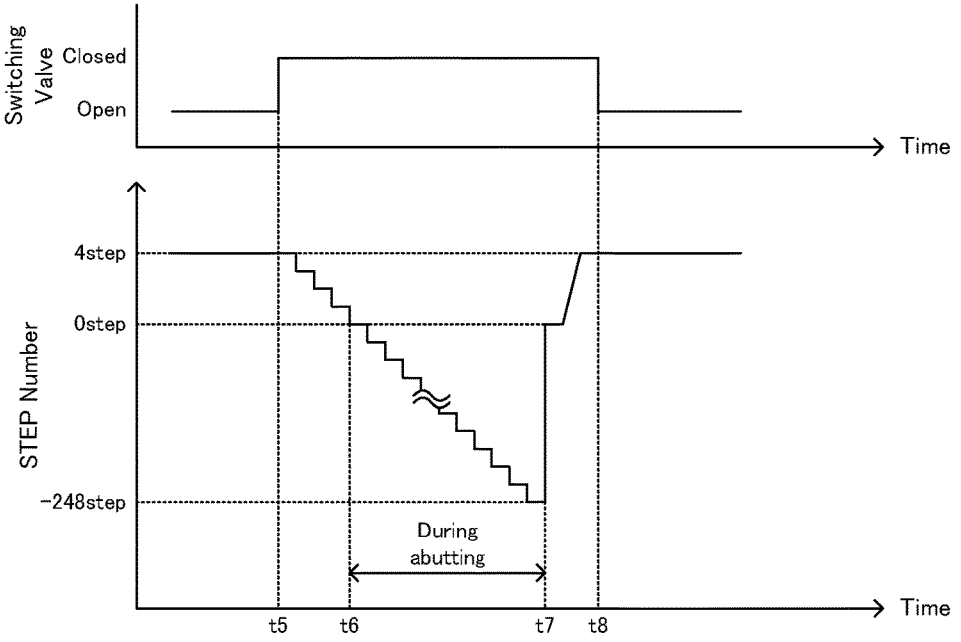

The initialization of the blocking valve 40 when the target step number is set to the specified number S2 will be specifically explained with reference to FIG. 4B. FIG. 4B illustrates that the specified number S2 is, but not limited to, "−248".

It is assumed that the tank pressure is determined to be the atmospheric pressure in the determination in the step S102 at a time point t5 in FIG. 4B. As a result, the ECU 19 may energize and open the switching valve 28v, may set the target step number to "−248 (i.e. the specified number S2)", and may start to initialize the blocking valve 40.

As illustrated in FIG. 4B, the ECU 19 may rotate the stepping motor 50 step by step in the valve closing direction. When the step number reaches "−248", the ECU 19 may stop the rotation of the stepping motor 50 (at a time point t7), and may modify only the step number to "0". The ECU 19 may then rotate the stepping motor 50 a predetermined number of steps (or four steps herein) in the valve opening direction, may open the switching valve 28v (at a time point t8), and may end the initialization of the blocking valve 40.

(Technical Effect)

There is a possibility that an actual position of the blocking valve 40 (i.e. an actual position of the valve guide 60) is shifted from a position corresponding to the step number of the stepping motor 50 (i.e. step-out). That is why the abutting is performed when the blocking valve 40 is initialized. If, however, the abutting is uniformly performed, i.e. if the step number with which the stepping motor 50 is rotated in the valve closing direction from the step number "0" is set to be a fixed value, when there is no step-out, the deterioration of the blocking valve 40 is accelerated due to the abutting. On the other hand, if the step number associated with the abutting is set to be relatively small in order to suppress the deterioration of the blocking valve 40, when there is the step-out, the step-out is possibly not solved due to insufficient abutting.

By the way, the switching valve 28v is open in principle, and when the purge valve 26v is closed, the pressure on a side closer to the canister 22 than the blocking valve 40 in the evaporated fuel processing apparatus 20 is the atmospheric pressure. Thus, if the blocking valve 40 is unintentionally open, the tank pressure of the fuel tank 15 is also the atmospheric pressure. Therefore, in the step S102 (in other words, before the initialization of the blocking valve 40), if it is determined that the tank pressure of the fuel tank 15 is the atmospheric pressure, the position of the blocking valve 40 is mostly likely shifted to the valve open side rather than the position corresponding to the step number of the stepping motor 50 (i.e. step-out) to be open.

On the other hand, when the blocking valve 40 is closed, the tank pressure of the fuel tank 15 is apparently higher or lower than the atmospheric pressure. Therefore, in the step S102 (in other words, before the initialization of the blocking valve 40), if it is determined that the tank pressure of the fuel tank 15 is not the atmospheric pressure, the blocking valve 40 is most likely closed.

Then, in the step S102, if it is determined that the tank pressure of the fuel tank 15 is the atmospheric pressure, i.e. if the blocking valve 40 is most likely open due to the step-out, the target step number is set to the specified number S2, which relatively increases the step number of the abutting. Here, the absolute value of the specified number S2 is desirably greater than a step number corresponding to a fully open position of the blocking valve 40. By virtue of such a configuration, the blocking valve 40 can be certainly initialized.

On the other hand, in the step S102, if it is determined that the tank pressure of the fuel tank 15 is not the atmospheric pressure, i.e. if the blocking valve 40 is most likely closed, the target step number is set to the specified number S1, which relatively reduces the step number of the abutting. The deterioration of the blocking valve 40 due to the abutting can be suppressed.

As a result, according to the evaporated fuel processing apparatus 20, it is possible to provide both the appropriate initialization of the blocking valve 40 and the suppression of the deterioration of the blocking valve 40.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An evaporated fuel processing apparatus including: a canister containing adsorbent for adsorbing evaporated fuel generated in a fuel tank; a vapor passage connecting the canister and the fuel tank; a tank pressure sensor configured to detect tank pressure of the fuel tank; and a blocking valve disposed in the vapor passage, wherein the blocking valve is [open] *closed* when a stroke amount is less than a predetermined amount, and the blocking valve is [closed] *open* when the stroke amount is greater than or equal to the predetermined amount, wherein the blocking valve has a stepping motor configured to adjust the stroke amount, and said evaporated fuel processing apparatus comprises an initializer wherein in response to an initialization request to move the blocking valve in the valve closing direction to a predetermined initial position, the initializer is configured to set a step number to a first or second specified number with which the stepping motor is rotated in a valve closing direction, and said second specified number having a greater absolute value than the first specified number;

wherein if the tank pressure of the fuel tank is in a predetermined pressure range close to atmospheric pressure the step number is set to the second specified number and if the tank pressure is out of the predetermined pressure range, the step number is set to the first specified number.

* * * * *